United States Patent

[11] 3,589,499

| [72] | Inventor | Nicholas G. Cristy |
| --- | --- | --- |
|  |  | Pleasantville, N.Y. |
| [21] | Appl. No. | 805,576 |
| [22] | Filed | Mar. 10, 1969 |
| [45] | Patented | June 29, 1971 |
| [73] | Assignee | The Macton Corporation |
|  |  | Danbury, Conn. |

[54] ARTICLE DISTRIBUTOR
9 Claims, 3 Drawing Figs.

[52] U.S. Cl. ..................................................... 198/103,
 198/209
[51] Int. Cl. ..................................................... B65g 37/00
[50] Field of Search.......................................... 198/103,
 209; 193/32, 1, 35, 35 A, 40; 211/151

[56] References Cited
UNITED STATES PATENTS

| 571,828 | 11/1896 | Conklin et al. | 193/35 UX |
| 1,444,359 | 2/1923 | Rand | 198/103 X |
| 1,644,342 | 10/1927 | Mabee | 198/103 X |
| 3,180,483 | 4/1965 | Johnston et al. | 198/209 |
| 3,360,104 | 12/1967 | Winfield | 198/209 X |
| 3,361,249 | 1/1968 | Caoman et al. | 198/103 |

Primary Examiner—Gerald M. Forlenza
Assistant Examiner—Frank E. Werner
Attorney—Buckles & Bramblett, Jr.

ABSTRACT: A baggage turntable is molded in true conical form from reinforced fiber glass. The integral outer wall is normal to the conical surface and along its inner rim is a resilient bumper formed of a plurality of cylindrical rollers. The turntable is surrounded by a stationary protective shroud.

PATENTED JUN29 1971

3,589,499

INVENTOR.
Nicholas G. Cristy
BY
Wooster, Davis & Cifelli
ATTORNEYS.

ARTICLE DISTRIBUTOR

BACKGROUND OF THE INVENTION

This invention relates to article distributors and, more particularly, to baggage turntables. Baggage turntables have been installed in a number of airline terminals and similar facilities. Conventionally, these turntables are conical and baggage if fed sequentially to the apex by means of a conveyor or chute. The bags slide down to the outer periphery where they may be picked up by passengers lining the circular edge. While such turntables have proved to be an efficient means for distributing baggage, those presently known to the art have certain deficiencies which it would be desirable to overcome.

In order to provide a smooth sliding surface for the bags, the turntables are customarily made from flat stainless steel plates cut in wedge shaped segments and pieced together to form an approximation of a conical surface. As the diameters of such turntables may be relatively large—for example, 25 feet—it will be apparent that a relatively large number of such segments are required in order to approach the desired conical configuration. Furthermore, this fact also causes the expense of manufacturing and installing the turntables to be higher than would be desired.

A second disadvantage of prior art turntables is that the outer peripheral wall is customarily vertical, thus forming, in cross section, an acute angle with the surface of the cone. This means that bags sliding down the inclined surface do not strike the wall squarely and the shock is not equally distributed. Bumpers are normally provided along the rim of this wall and small articles, such as attache cases, may easily become wedged beneath the bumper.

Still another disadvantage of prior art turntables is that heavy bags may be difficult to lift over the bumper and off the turntable. This is compounded by the fact that the turntable must be mounted fairly high above the floor to provide clearance for the bracing and supporting structure required to unify the large number of segments. Furthermore, the resilient nature of the bumper also results in a fairly high friction against a bag which is being dragged over it.

Accordingly, it is a primary object of the present invention to provide an article distributor, such as a baggage turntable, having a substantially true conical surface. Other objects are to form such a turntable wherein baggage shock is distributed over a greater surface; wherein baggage may be more easily lifted from the turntable; and wherein the turntable may be more easily and cheaply constructed and installed than those known to the prior art.

SUMMARY OF THE INVENTION

An article distributor comprises a molded turntable of true conical configuration having a raised central portion and an integral, upwardly extending peripheral wall. Means are provided for rotatably supporting and driving the turntable. Additional means are provided for delivering articles to the central portion in position to slide toward the wall.

BRIEF DESCRIPTION OF THE DRAWING

The invention may be best understood by reference to the accompanying drawing wherein.

DESCRIPTION OF THE PREFERRED EMBODIMENT

Figure 1:
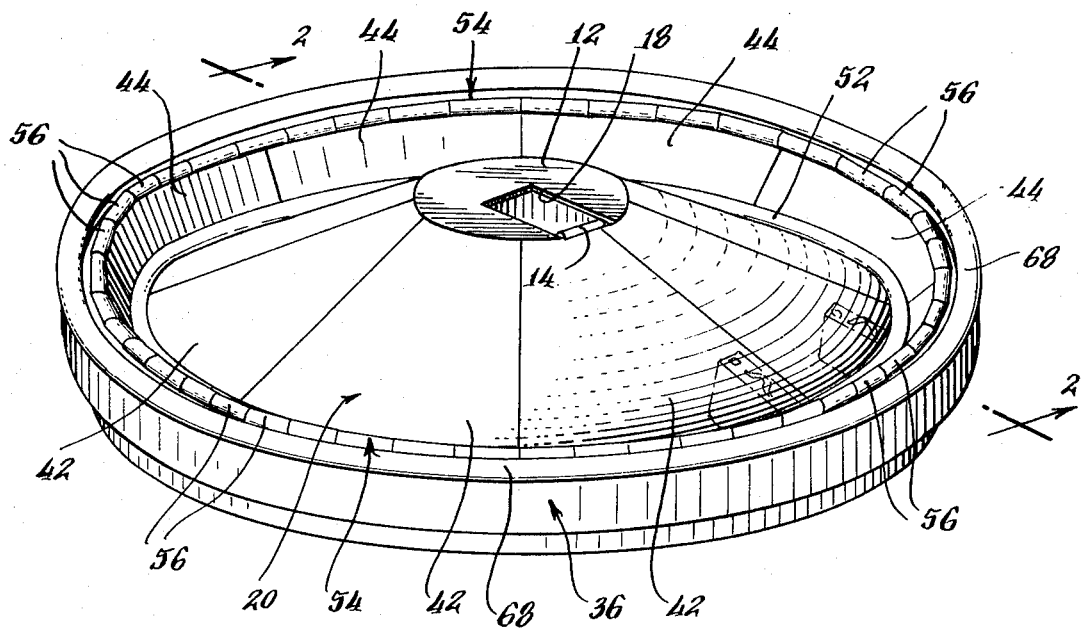
FIG. 1 is a perspective view of a baggage turntable incorporating the present invention.
Figure 2:
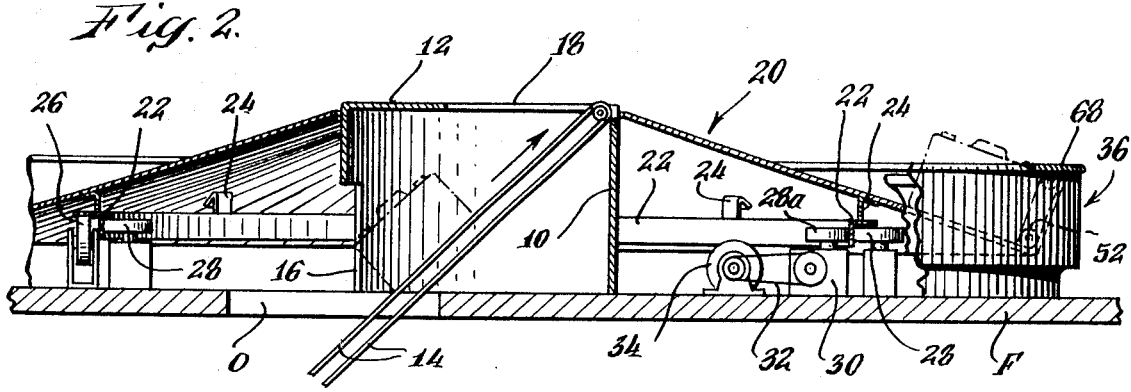
FIG. 2 is a cross section taken substantially along the line 2-2 of FIG. 1.
Figure 3:
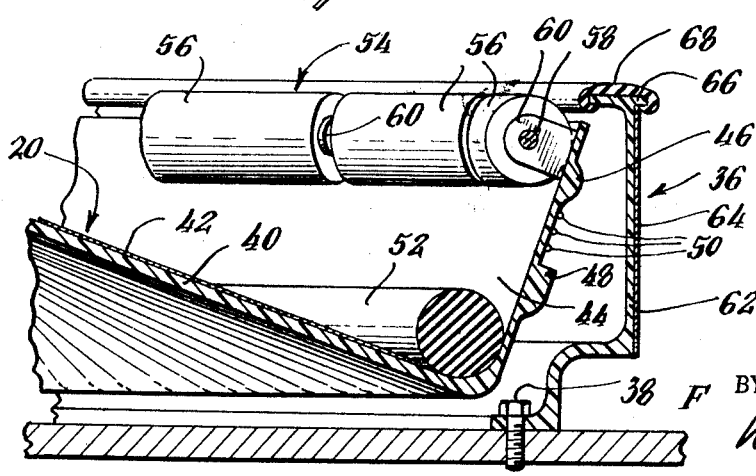
FIG. 3 is an enlarged cross section of the peripheral rim area of the baggage turntable.

In FIGS. 1—3 there is illustrated a baggage turntable embodying the present invention. It includes a stationary central structure comprising a cylindrical side wall 10 and a flat top 12. This central structure is appropriately secured to the floor F of the terminal. A conveyor belt 14 extends through an opening 0 in the floor and through openings 16, 18 in the side wall and top, respectively, for transporting luggage. Surrounding the central structure is a frustoconical turntable 20.

The turntable 20 may be supported for rotation in any way known to the art. In the illustrated embodiment, a circular angle iron 22 is secured to the underside of the turntable by brackets 24. At suitably spaced points about its periphery, the angle iron is supported by vertical rollers 26 and maintained in alignment by horizontal rollers 28. One such roller, 28a, is driven through a gear box 30, belt 32, and motor 34 to frictionally rotate the angle iron and turntable. Surrounding the outer periphery of the turntable 20 is a stationary shroud 36 suitably secured to the floor F, as by bolts 38.

One important feature of this invention is that the turntable 20 is truly conical, rather than being formed of a relatively large number of plane segments. This is accomplished by assembling the turntable of true conical sections 40 (FIG. 3) molded of a suitable material, such as reinforced fiber glass. In order to provide a sliding surface, a thin sheet of stainless steel 42 may be bonded in a known manner to each section. In this manner, a truly conical surface is obtained. An additional advantage which results from forming a turntable as a true cone is that it may be assembled from a substantially fewer number of segments than is possible with prior art turntables and with considerably less bracing and supporting structure. This is because a large number of planar segments must be employed to approximate a conical surface. In FIG. 1, for example, it will be noted that only eight segments are employed. In fact, except for space problems in manufacturing and shipping, it would be possible to form such a turntable in a single piece.

An additional feature of the turntable of this invention is that the outer wall portion 44 of each segment, which is molded integrally therewith, slopes upwardly at an angle normal to the surface of the cone, as shown in FIG. 3. In this manner, the impact load of sliding baggage is distributed. Rigidity of the completed turntable is assured by means of suitably molded ribs 46, 48 and a tension wire wrap 50.

Mounted at the intersection of the outer wall 44 and the conical section 40 is a lower bumper 52 of a suitable resilient material, such as rubber. Adjacent the rim of outer wall 44 is an upper bumper 54 formed from a plurality of short resilient rollers 56 mounted to be freely rotatable about shafts 58 mounted in suitable brackets 60. Forming the upper bumper as a series of rollers greatly simplifies the removal of heavier bags, as they may simply be rolled over the top rather than being lifted vertically upward. As previously described, the upper and lower bumpers cooperate to receive the shock of heavier bags and the lower bumper serves the additional purpose of preventing smaller items, such as attache cases and brief cases, from wedging beneath the upper bumper.

The shroud 36 surrounding the turntable may comprise a preformed fibre glass or plywood base 62. For purposes of appearance and wear resistance, the outer surface of the shroud base may be covered with a stainless steel sheet 64 bonded thereto in the usual manner. The top edge of shroud base 62 is formed with a horizontal flange 66 which stiffens the shroud and supports a handrail cover 68 which may be a vinyl extrusion. It will be noted from FIG. 3 that the handrail 68 and the upper bumper 54 cooperate to form a sight seal, thereby improving the appearance of the turntable assembly.

It is believed that the many advantages of this invention will now be apparent to those skilled in the art. It will also be apparent that a number of variations and modifications may be made therein without departing from its spirit and scope.

What I claim is:

1. An article distributor which comprises: a molded turntable of substantially true conical configuration having a raised central portion and an integral, upwardly extending peripheral wall substantially normal to its conical surface; means for rotatably supporting said turntable; drive means for rotating said turntable; and means for delivering articles to said central portion in position to slide toward said wall.

2. The distributor of claim 1 wherein the top of said turntable is faced with a metallic sliding surface.

3. The distributor of claim 1 wherein a plurality of substantially cylindrical resilient rollers are rotatably mounted around the inner rim of said wall to form an upper bumper.

4. The distributor of claim 3 wherein a resilient lower bumper encircles said turntable at the intersection with said wall.

5. The distributor of claim 1 wherein said turntable is encircled by a stationary shroud adjacent said wall.

6. The distributor of claim 5 wherein the top of said shroud comprises a substantially horizontal flange.

7. The distributor of claim 6 wherein said flange supports a handrail cover.

8. The distributor of claim 1 wherein said turntable includes a resilient bumper extending along the inner rim of said wall; and said turntable is encircled by a stationary shroud having upon its top a substantially horizontal flange supporting a handrail, said handrail and bumper cooperatively forming a sight seal between the rotating and stationary portions of said distributor.

9. An article distributor which comprises: a turntable of substantially conical configuration having a raised central portion and an upwardly extending peripheral wall; a plurality of substantially cylindrical resilient rollers rotatably mounted around the inner rim of said wall to form a bumper; means for rotatably supporting said turntable; drive means for rotating said turntable; and means for delivering articles to said central portion in position to slide toward said wall.